(12) United States Patent
Kim et al.

(10) Patent No.: US 12,077,335 B2
(45) Date of Patent: Sep. 3, 2024

(54) PACKING BOX FOLDING SYSTEM

(71) Applicant: CJ CHEILJEDANG CORPORATION, Seoul (KR)

(72) Inventors: Myung Ho Kim, Jincheon-eup (KR); Sung Woo Park, Jincheon-eup (KR); Bong Yong Sung, Gimhae-si (KR); Hee Dong Son, Changwon-si (KR); Dae Hwa Kim, Osan-si (KR); Sun Kyu Kim, Hwaseong-si (KR); Soo Hyun Kim, Gimpo-si (KR); Hak Dong Kim, Suwon-si (KR); In Soo Jung, Suwon-si (KR)

(*) Notice: Subject to any disclaimer, the term of this patent is extended or adjusted under 35 U.S.C. 154(b) by 93 days.

(21) Appl. No.: 17/801,186

(22) PCT Filed: Feb. 19, 2021

(86) PCT No.: PCT/KR2021/002129
§ 371 (c)(1),
(2) Date: Aug. 19, 2022

(87) PCT Pub. No.: WO2021/167403
PCT Pub. Date: Aug. 26, 2021

(65) Prior Publication Data
US 2023/0097351 A1    Mar. 30, 2023

(30) Foreign Application Priority Data
Feb. 19, 2020    (KR) .................. 10-2020-0020681

(51) Int. Cl.
*B65B 61/00*    (2006.01)
*B65B 69/00*    (2006.01)
*B31B 120/30*    (2017.01)

(52) U.S. Cl.
CPC ........ *B65B 61/00* (2013.01); *B31B 2120/302* (2017.08); *B65B 69/00* (2013.01); *B65B 2220/04* (2013.01)

(58) Field of Classification Search
CPC ..... B65B 61/00; B65B 69/00; B65B 2220/04; B31B 2120/302
(Continued)

(56) References Cited

U.S. PATENT DOCUMENTS 1,230,516 A * 6/1917 Raynaud ........... B31B 2120/302
493/311
1,355,398 A * 10/1920 Inman et al. ........... B31B 50/00
493/179

(Continued)

FOREIGN PATENT DOCUMENTS

DE    3439732 C1    12/1985
EP    1415921 A1    5/2004
(Continued)

OTHER PUBLICATIONS

Extended European Search Report issued in European Patent Application No. 21756464.0, mailed Aug. 4, 2023.
(Continued)

*Primary Examiner* — Stephen F. Gerrity
(74) *Attorney, Agent, or Firm* — DILWORTH IP, LLC

(57) ABSTRACT

A packing box folding system, and the packing box folding system including a transfer conveyor on which transfers the packing box from a packing box introducing position to a folded packing box discharging position; a fixed guide panel which extends between the packing box introducing position and the packing box discharging position and is disposed on one side of the transfer conveyor in the width-direction; and a movable suction device which is disposed on the side opposite to the fixed guide panel in the width-direction of the
(Continued)

transfer conveyor and is movable between the packing box introducing position and the packing box discharging position, wherein the movable suction device suctions the side surface of the packing box, which faces the side surface in contact with the fixed guide panel, and presses the suctioned side surface inward in the width-direction.

5 Claims, 12 Drawing Sheets

(58) Field of Classification Search
USPC .......................................................... 493/311
See application file for complete search history.

(56) References Cited

U.S. PATENT DOCUMENTS

| | | | | | |
|---|---|---|---|---|---|
| 2,138,766 | A | * | 11/1938 | MacDonald | ......... B65D 5/3678 |
| | | | | | 493/311 |
| 3,309,970 | A | * | 3/1967 | Pierce | ..................... B31B 50/00 |
| | | | | | 493/311 |
| 3,326,096 | A | * | 6/1967 | Mendoza | ................ B31B 50/00 |
| | | | | | 493/309 |
| 3,791,268 | A | * | 2/1974 | Kollmar | .................. B31B 50/00 |
| | | | | | 493/311 |
| 3,973,372 | A | | 8/1976 | Omori | |
| 11,919,683 | B2 | * | 3/2024 | Manneux | ............. B65D 5/0236 |
| 2014/0238819 | A1 | * | 8/2014 | Kleiner | ................... B31B 50/00 |
| | | | | | 198/345.1 |
| 2019/0184671 | A1 | * | 6/2019 | Yokota et al. | ........ B31B 50/802 |
| 2021/0138755 | A1 | * | 5/2021 | Langen | ................ B31B 50/262 |

FOREIGN PATENT DOCUMENTS

| | | | |
|---|---|---|---|
| GB | 256383 | A | 8/1926 |
| JP | H05254525 | A | 10/1993 |
| JP | H05330528 | A | 12/1993 |
| JP | 2000153816 | A | 6/2000 |
| JP | 2001-018932 | A | 1/2001 |
| JP | 2003026154 | A | 1/2003 |
| JP | 2004075144 | A | 3/2004 |
| JP | 2005254525 | A | 9/2005 |
| JP | 2009137625 | A | 6/2009 |
| JP | 2017-105480 | A | 6/2017 |
| KR | 10-2119676 | B1 | 6/2020 |

OTHER PUBLICATIONS

International Search Report from WIPO in Application No. PCT/KR2021/002129 dated Jun. 16, 2021, 6 pages.

* cited by examiner

PACKING BOX FOLDING SYSTEM

FIELD OF THE INVENTION

The present invention relates to a packing box folding system, and more particularly, to a system for folding an empty packing box having a rectangular parallelepiped shape and opened upper and lower surfaces, by overlapping its side surfaces one another and also overlapping its panels serving as the upper and lower surfaces each other.

BACKGROUND OF THE INVENTION

A box having a rectangular parallelepiped shape has been generally used as a packing container for transporting and storing a product.

FIGS. 1A-1B show a generally-used type of a packing box.

A packing box 1 may be mainly made of a paper panel coated with a synthetic resin film, and may have upper and lower surfaces each covered and closed with four upper panels extending from side surfaces of the packing box.

The upper surface and lower surface of the packing box have the same structure as each other, and the upper surface is thus described with reference to FIG. 1A. Here, four upper panels 3 and 4 may be two pairs each including two panels opposite to each other, and may be folded from edges of the side surfaces, and end portions of the panels may thus be in contact with or adjacent to each other, thereby closing the upper surface of the packing box. A pair of second upper panels 4 may be folded to be opposite to each other, and the other pair of first upper panels 3 may then be folded to be opposite to each other and then placed perpendicular to the previously folded pair of second upper panels 4. Similarly, the lower surface of the packing box 1 may also be closed when a pair of first lower panels 5 and a pair of second lower panels 6 placed perpendicular thereto are folded to each other.

In this specification, an expression "the lower or upper surface" is used only for convenience of description, and when the lower surface of the packing box 1 is turned upward, the lower surface may be the upper surface and the panels covering the lower surface may be the upper panel.

First, the lower surface of the packing box 1 may be closed by covering the lower panels 5 and 6, and then by bonding the opposite end portions of the first lower panels 5 which are placed on the panels 6 to each other by using an adhesive tape, a product may be put from the upper surface of the packing box 1 and accommodated therein, the packing box may then be closed as described above by folding the upper panels 3 and 4, and then by bonding the end portions of the first upper panels 3 which are placed on the upper panels 4 by using the adhesive tape, and the closed packing box 1 may then be transported or stored.

Meanwhile, when the packing box 1 configured as described above and accommodating the product is opened to take out the product therefrom, the adhesive tape bonding the first upper panels 3 to each other may be cut, all the upper panels 3 and 4 may then be unfolded outward to open the upper surface, and the product accommodated in the packing box may then be taken out.

After the product is taken out, the empty packing box 1 may be turned over so that positions of the upper and lower surfaces are inversed to each other, the adhesive tape bonding the first lower panels 5 which are placed on the lower panels 6 to each other may then be cut, and the lower panels 5 and 6 may be unfolded. FIG. 1B shows this state.

After the lower panels 5 and 6 of the packing box 1 are unfolded, side surfaces 7 and 8 of the packing box 1 may be overlapped to each other, the upper panels 3 and 4 and the lower panels 5 and 6 may then also be folded to be overlapped each other, and the folded packing box 1 may then be overlapped to other packing boxes to be discharged as a recycling resource.

Accordingly, the following operations are usually performed by relying on human manual works: operations of opening the packing box 1, taking out the product from the packing box, arranging and transporting the taken-out products, and folding and collecting the empty boxes from each of which the product is taken out for the recycling.

Although requiring no skilled labor, these manual works may still be time-consuming and expensive, and may sometimes fail because a person performs the works.

Korean Patent Publication Nos. 10-1554009 (Document 1) and 10-1527654 (Document 2) disclose a configuration enabling a product to be easily taken out from a packing box. However, these documents do not suggest a configuration for automatically performing operations of post-processing the empty packing box left after taking out the product therefrom for its discard or recycling.

SUMMARY OF THE INVENTION

Technical Problem

An embodiment of the present invention provides a packing box folding system for automatically folding and overlapping empty packing boxes each other.

In detail, an embodiment of the present invention provides a system for automatically performing an operation of folding an empty packing box having a rectangular parallelepiped shape and two opposite surfaces opened, by unfolding adjacent surfaces of the packing box and overlapping the opposite surfaces each other.

In addition, an embodiment of the present invention provides a system for automatically performing operations of folding individual packing boxes and overlapping the folded packing boxes each other, and stacking the overlapped packing boxes.

Technical Solution

According to an embodiment of the present invention, provided is a packing box folding system in which a packing box is folded as surfaces of the packing box are overlapped by in contact with each other, the packing box having a rectangular parallelepiped shape and including upper and lower surfaces opposite to each other and respectively opened by unfolding upper panels and lower panels.

The packing box folding system includes:

a transport conveyor on which the packing box is loaded and which transports the packing box from a position where the packing box is introduced to a position where the folded packing box is discharged;

a fixed guide panel which extends between the position where the packing box is introduced to the position where the folded packing box is discharged, is disposed on one side of the transport conveyor in a width direction, and is able to come into contact with two side surfaces of the packing box, which are adjacent to each other;

a movable suction device which is disposed opposite to the fixed guide panel in the width direction of the transport conveyor, is movable between the position where the packing box is introduced and the position where the packing box is discharged, suctions side surfaces which are opposite to the side surfaces of the packing box, in contact with the fixed guide panel, and presses the suctioned side surfaces inward the width direction;

a first pressing device which is disposed between both end portions of the fixed guide panel in a transport direction of the conveyor belt, and obliquely presses the side surface placed downstream among the side surfaces of the packing box, in contact with the fixed guide panel, inward the width direction and upstream in the transport direction; and a second pressing device which is disposed downstream of the first pressing device in the transport direction of the conveyor belt, and presses the surface of the packing box, in contact with the fixed guide panel, inward the width direction.

The fixed guide panel may include a first surface extending parallel to a side surface parallel to the transport direction of the transport conveyor, among the two side surfaces of the packing box, adjacent to each other, and a second surface placed downstream of the first surface and extending obliquely inward the width direction with respect to the transport direction, the packing box may be introduced into the transport conveyor and one side surface of the packing box, placed parallel to the transport direction, may come into contact with the first surface of the fixed guide panel, and as the movable suction device suctions the side surfaces of the packing box and presses the suctioned side surfaces of the packing box inward the width direction, while being moved downstream, among the side surfaces of the packing box, placed downstream perpendicular to the transport direction, the side surfaces of the packing box, adjacent and perpendicular to each other, may be unfolded, and the side surfaces of the packing box, opposite to each other, may come into contact with and overlap each other, by being pressed by the first pressing device, the second pressing device and the movable suction device.

Described is an operation of the packing box folding system according to the present invention.

The packing box may be placed on the transport conveyor and introduced into the folding system of the present invention.

The packing box may have the rectangular parallelepiped shape, and each side surface may thus have side surfaces adjacent to each other and the side surfaces opposite to each other. In the packing box introduced into the folding system of the present invention, the two adjacent side surfaces may be in contact with the first surface of the fixed guide panel, and the other two adjacent side surfaces opposite to these surfaces may be supported by the movable suction device disposed to face the fixed guide panel.

Next, the movable suction device may suction the side surface of the packing box and be moved in the transport direction. Here, the side surfaces of the packing box may come into contact with the second surface of the fixed guide panel. The second surface may be inclined inward the width direction, and the side surfaces of the packing box, in contact with the second surface, may thus be pressed inward the width direction; and the movable suction device may press the side surfaces of the packing box inward the width direction, and the opposite side surfaces of the packing box may also be pressed inward the width direction. In addition to this pressure, the first pressing device may press the side surfaces of the packing box inward the width direction and upstream in the transport direction.

Accordingly, the adjacent side surfaces of the packing box may be unfolded and deformed to come into contact with the side surfaces opposite to each other.

The movable suction device may transport the packing box downstream while suctioning the packing box, and the second pressing device may be operated at an end portion of the fixed guide panel. The side surfaces of the packing box may be almost parallel to each other at the end point of the fixed guide panel, and the second pressing device and the movable suction device may press the side surfaces of the packing box inward the width direction to come into contact with each other, and the packing box may thus be fully unfolded, thereby completing the folding operation.

In this way, the folded packing box may be suctioned by the movable suction device to be stacked or transported.

As an additional feature in the packing box folding system according to the present invention, the movable suction device may be rotated for the side surfaces of the packing box to be placed horizontally in a state of suctioning the packing box, whose side surfaces are overlapped by in contact with each other.

As another additional feature in the packing box folding system according to the present invention, the movable suction device may include a frame which is movable in the transport direction, a movable panel which extends in the transport direction, a plurality of aspirators which are arranged on a surface of the movable panel, facing inward the width direction, a driving module which presses the movable panel inward the width direction, and an actuator which rotates the movable panel vertically downward.

As still another additional feature in the packing box folding system according to the present invention, the packing box may be introduced into the transport conveyor in a state where the upper panels are unfolded, the upper surface is placed on the transport conveyor and the lower panels covering the lower surface are turned upward. Here, the system may further include an opening device which opens the lower panels of the packing box from the lower surface of the packing box, wherein the opening device includes a means which is placed below the transport conveyor, enters the packing box through the opened upper surface of the packing box, and presses the lower panels upward to be opened.

In the folding system according to the present invention, the packing box having a rectangular parallelepiped shape and including two opposite surfaces opened may be folded. However, when a product is taken out from the packing box, only one side surface of the packing box may be opened, and the opposite side surface of the packing box may not be opened.

Meanwhile, in the configuration that the lower panels of the packing box are opened by the opening device, the system may further include a support device which is placed at the rear of the fixed guide panel in the width direction of the transport conveyor, and protrudes inward the width direction to come into contact with and support the side surfaces of the packing box when the lower surface of the packing box is opened by the opening device, wherein the support device and the movable suction device press and fix the side surfaces of the packing box which are opposite to each other when the lower surface of the packing box is opened.

Advantageous Effects

In the folding system according to the present invention, the packing box may be introduced and folded automatically without the human intervention to be easily recycled or discarded.

The overlapped packing boxes may be in the upright state. However, the movable suction device may be rotated to place the packing box horizontally, and the packing boxes processed by the folding system of the present invention may be stacked up and down. Accordingly, the processed packing box may be easily transported or stored.

The movable suction device may transport and press the packing box by moving the aspirator in the transport and width directions while suctioning the side surfaces of the packing box, and convert the packing box from the upright state to the horizontal state. According to this configuration of the movable suction device, the packing box may be easily processed.

According to the additional characteristic configuration of the present invention, even in case that the packing box has one surface which is not opened, the packing box may be opened and folded by the opening device placed below the transport conveyor and operated.

In particular, the opening device may be placed below the transport conveyor and operated. Accordingly, the overall size of the system may not be excessive, and the opening operation may be performed at the position where the packing box is introduced into the folding system of the present invention without requiring any additional process for the opening operation.

When the opening device is operated, the support device and the movable suction device may press and fix the packing box from both the sides thereof. Accordingly, the lower panel may be opened smoothly, and the packing box may not deviate from the system or be deformed due to the pressure during the opening operation.

BRIEF DESCRIPTION OF THE INVENTION

DETAILED DESCRIPTION OF THE INVENTION

Hereinafter, the description describes the configuration and operation of a packing box folding system according to an embodiment of the present invention as detailed contents for carrying out the present invention with reference to the drawings.

Figure 1A:
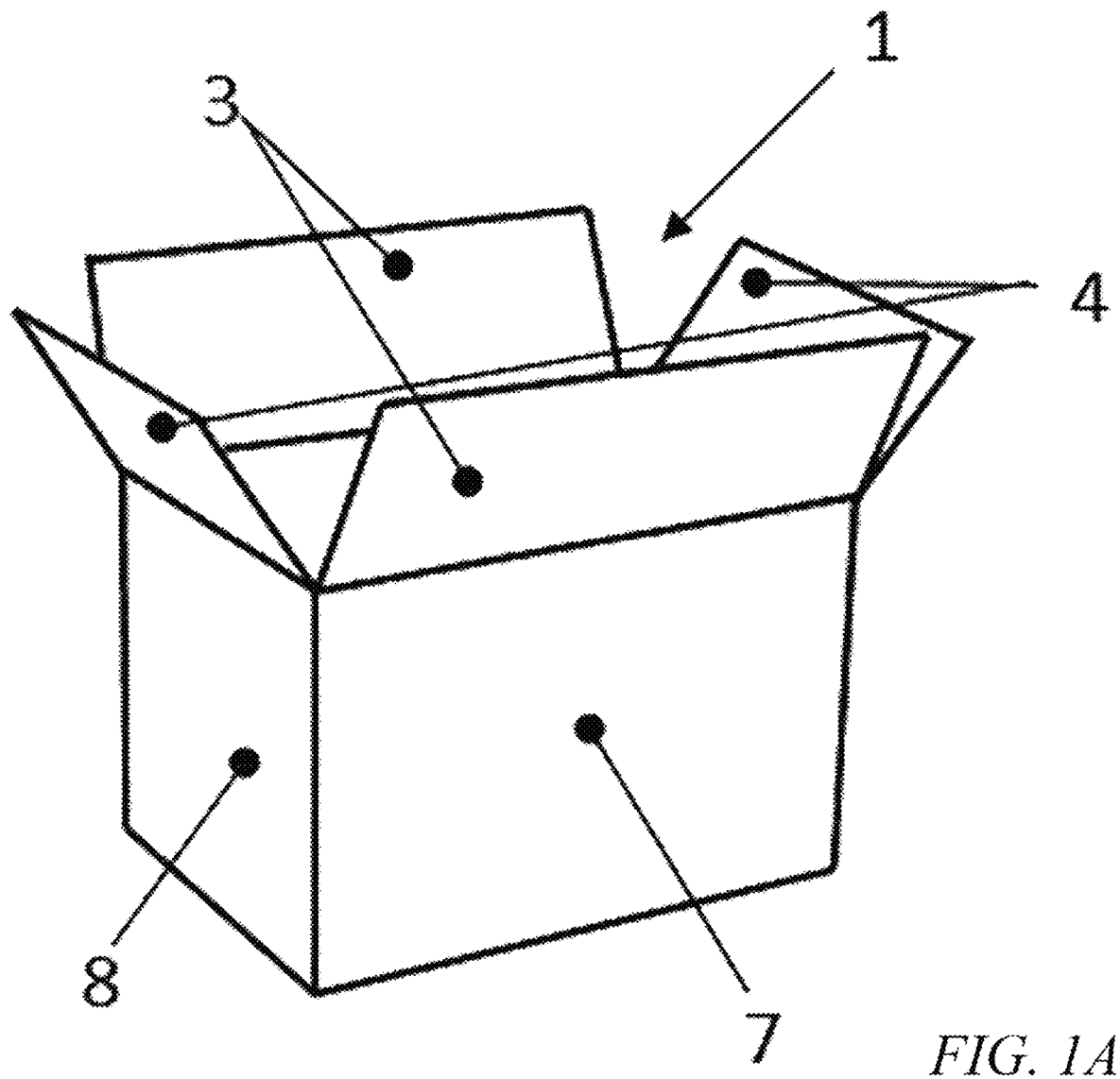
FIGS. 1A-1B are perspective views of a packing box to be folded in a folding system according to an embodiment of the present invention.
Figure 1B:
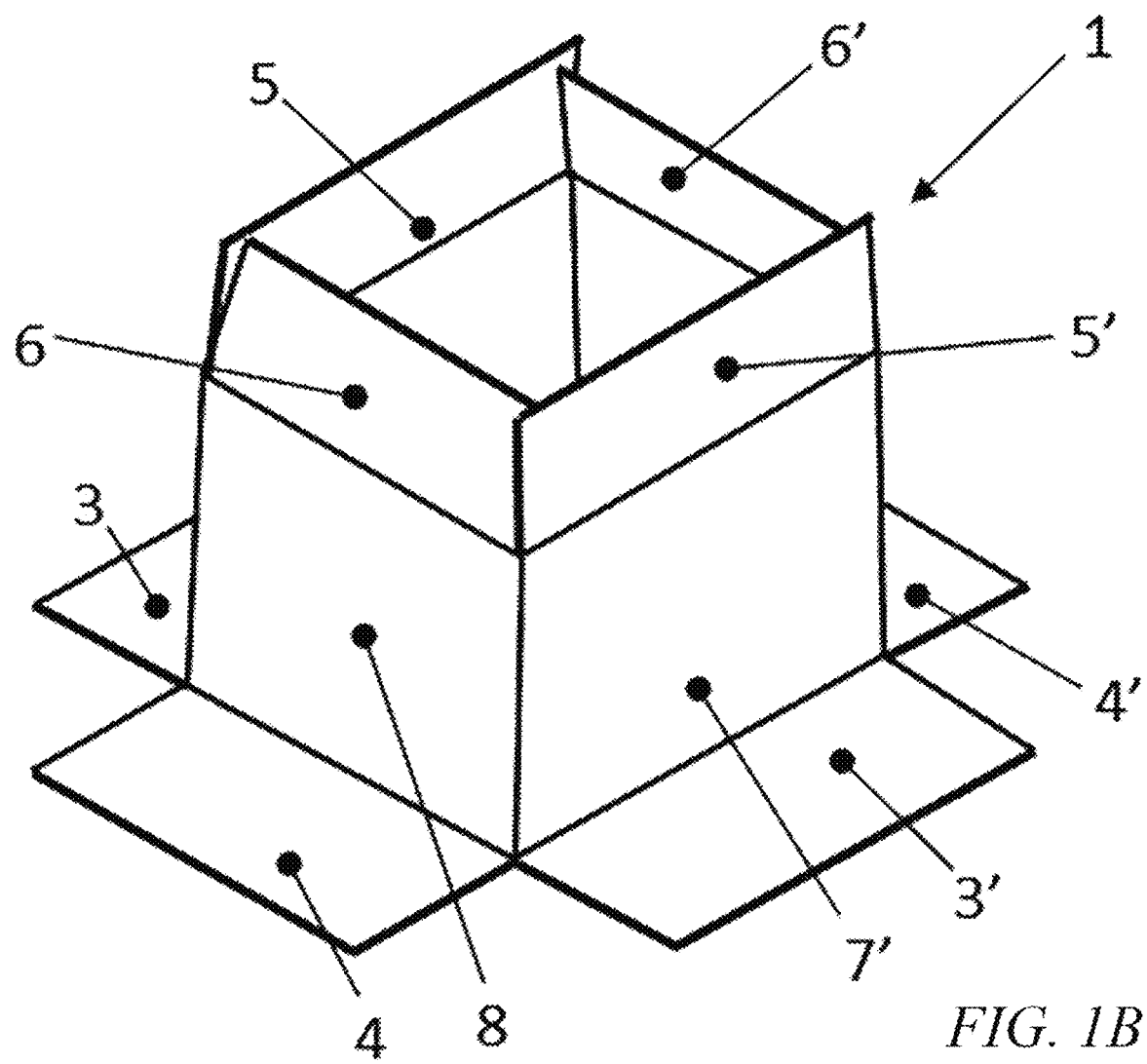

An inversion system of this embodiment may invert an empty packing box left after the product is taken out from the packing box having a configuration shown in FIGS. 1A-1B.

An adhesive tape bonding first upper panels 3 of a packing box 1 to each other may be cut, and a product may be taken out from the packing box while four upper panels 3 and 4 are spaced apart from each other, and the packing box may then be inverted so that an upper surface thereof is turned downward and a lower surface thereof is turned upward. Here, lower surface panels 5 and 6 for covering the lower surface may still cover the lower surface, and the packing box may then be transported to the folding system of this embodiment in a state where the adhesive tape bonding the first lower panels 5 to each other is cut.

Hereinafter, the description describes the configuration of the folding system according to this embodiment with reference to FIGS. 2 to 4.

Figure 2:
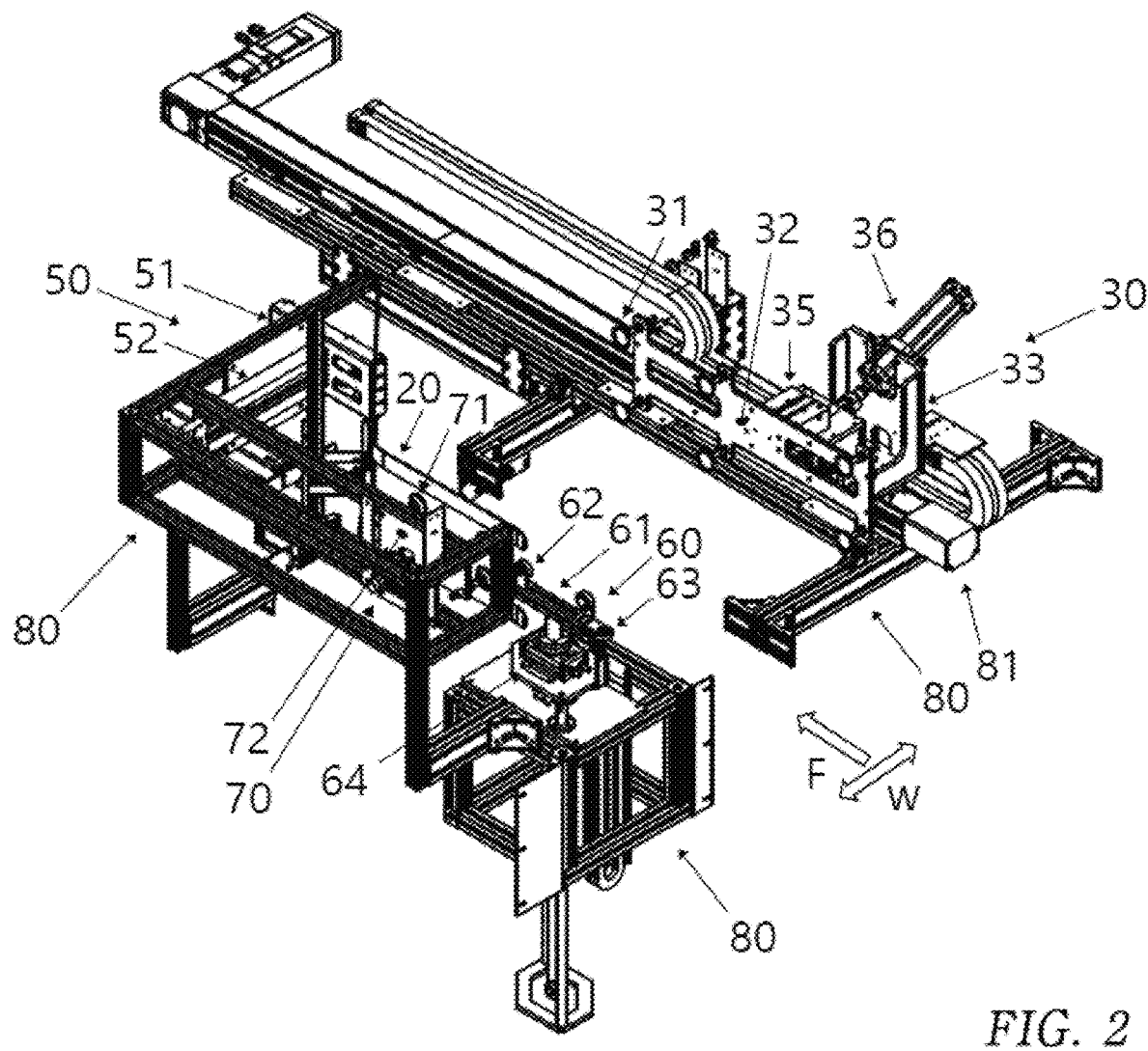
FIGS. 2 to 4 are a perspective view, a plan view and a front view of the folding system according to an embodiment of the present invention, respectively.
Figure 3:
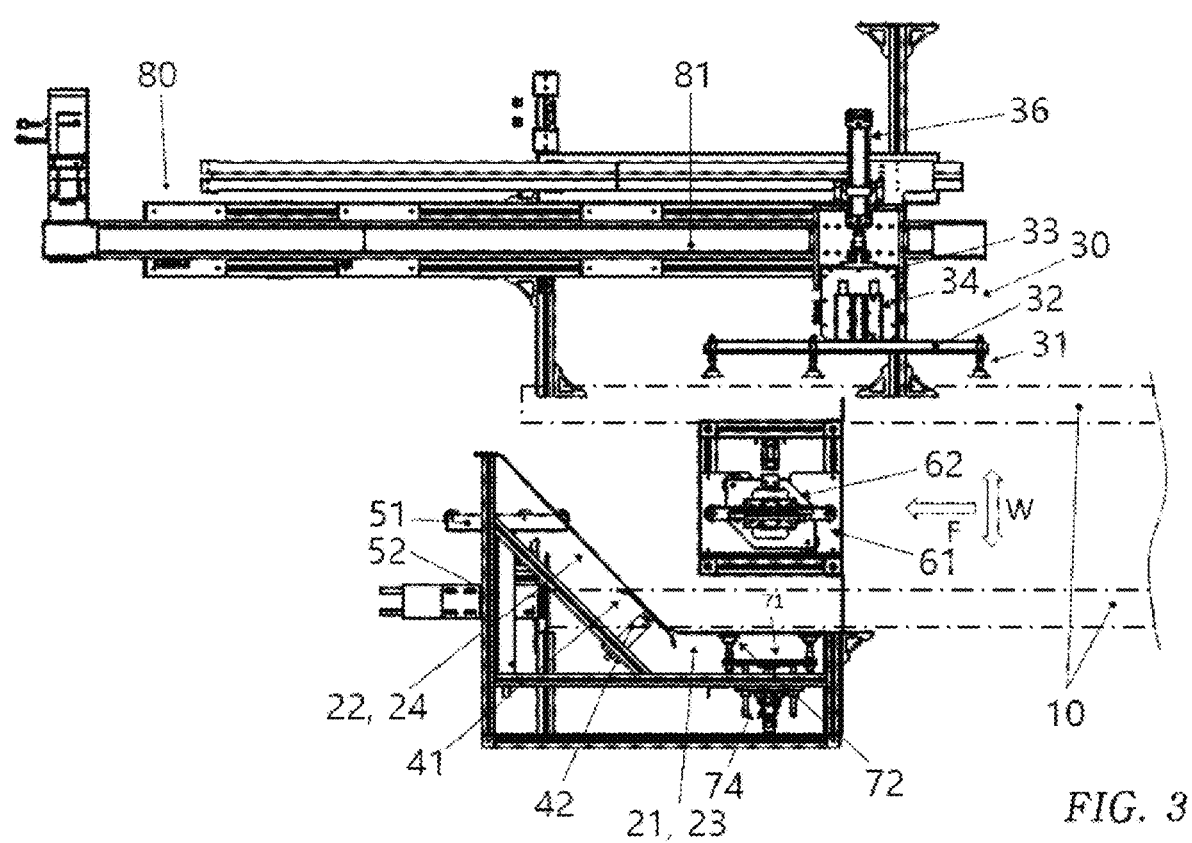
Figure 4:
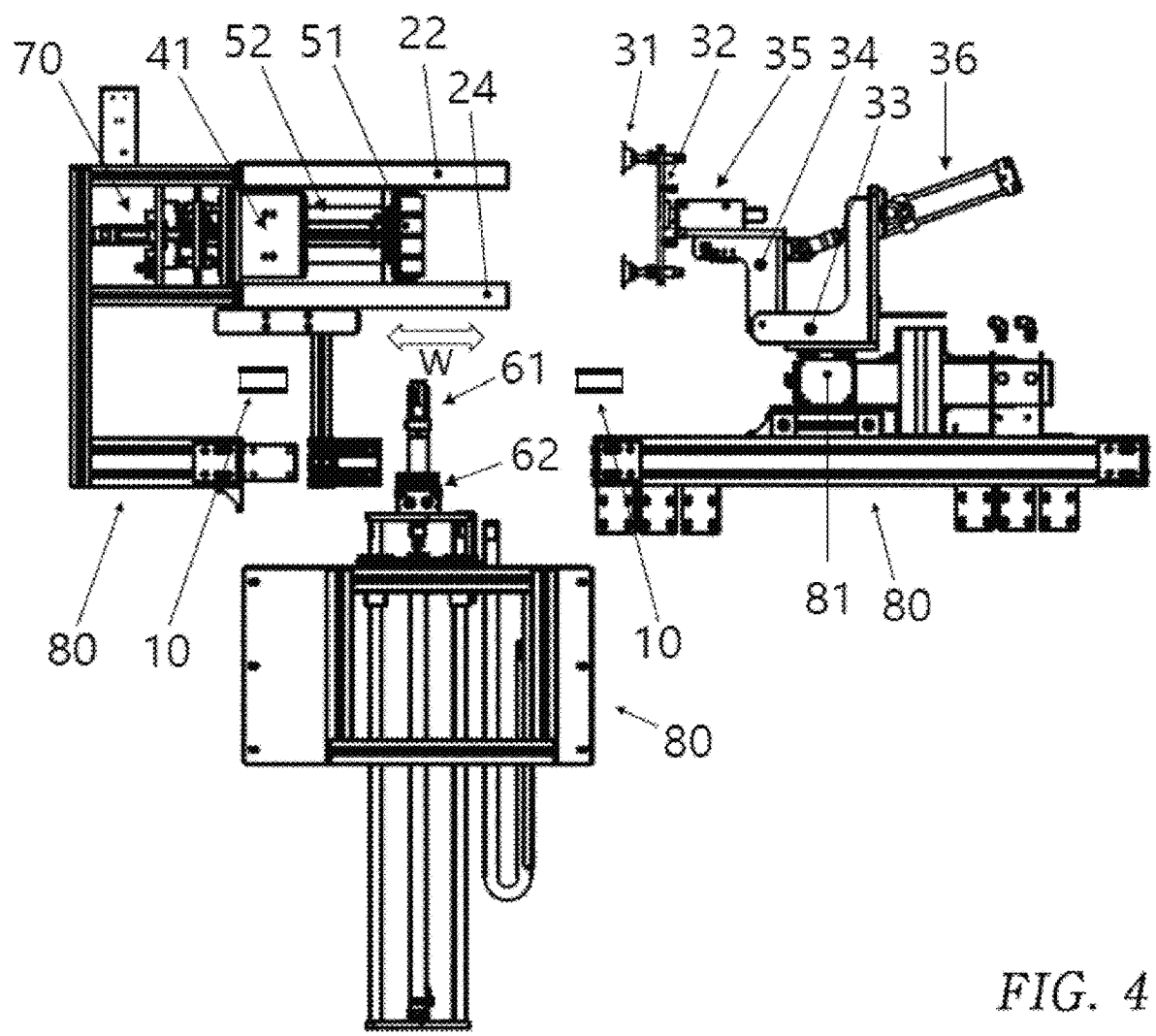

For convenience of illustration, FIG. 2 omits a transport conveyor, and FIGS. 3 and 4 omit a roller or a driving motor included in a transport conveyor 10, and only show a pair of conveyor belts 10 included in the transport conveyor.

When roughly described, the folding system of this embodiment includes:

the conveyor belts 10 serving as a transport conveyor on which the packing box 1 is loaded and which transports the packing box 1 from a position where the packing box 1 is introduced to a position where the folded packing box 1 is discharged; a fixed guide panel 20 which extends between the position where the packing box 1 is introduced to the position where the folded packing box 1 is discharged, is disposed on one side of the conveyor belt 10 in a width direction, and is able to come into contact with two side surfaces 7 and 8 of the packing box 1, which are adjacent to each other; a movable suction device 30 which is disposed opposite to the fixed guide panel 20 in the width direction "W" of the conveyor belt 10, is movable between the position where the packing box 1 is introduced and the position where the packing box 1 is discharged, suctions side surfaces 7' and 8' which are opposite to the side surfaces 7 and 8 of the packing box 1, in contact with the fixed guide panel 20, and presses the suctioned side surfaces inward the width direction; a first pressing device 40 which is disposed between both end portions of the fixed guide panel 20 in a transport direction "F" of the conveyor belt 10, and obliquely presses the side surface 7 of the packing box 1, in contact with the fixed guide panel 20, inward the width direction "W" and upstream in the transport direction "F"; a second pressing device 50 which is mounted downstream of the fixed guide panel 20 in the transport direction "F" of the conveyor belt 10, and presses the side surface 7 of the packing box 1, in contact with the fixed guide panel 20, inward the width direction "W"; an opening device 60 which opens the lower panels 5 and 6 of the packing box 1 from the lower surface of the packing box 1; a support device 70 which is placed at the rear of the fixed guide panel 20 in width direction "W," and protrudes inward the width direction to come into contact with and support the side surface 8 of the packing box 1 when the lower panels 5 and 6 of the packing box 1 are opened by the opening device 50; and a frame 80 which the components of the folding system of this embodiment are attached to and supported by.

The drawings do not show the entire frame 80, and only show only a portion of the frame, to which each component is mounted, or omit the frame for convenience of the illustration. However, each component may be attached to and supported by the frame unless there is a description of a separate position to which each component is attached.

In addition, the frames 80 may not need to be coupled to each other as single-type components, and may be supported by being coupled to the ground at a location where the folding system of this embodiment is installed or a frame or components included in another system. However, in this embodiment, the component referred to as the frame 80 is a generic term for supporting other functional components coupled thereto.

The conveyor belt 10 may refer to two parallel belts which are wounded on a roller (not shown) and circulated by a driving motor.

The packing box 1 may be rotated after the product is taken out, and then be inverted so that the opened upper surface is turned downward and the lower surface is turned upward. Here, the adhesive tape bonding the first lower panels 5 to each other may be cut, and the packing box may be placed on and transported by the conveyor belt 10 in a state where both the lower panels 5 and 6 cover the lower surface.

The conveyor belt 10 may continuously extend from a position, where the operations of inverting the packing box and cutting the adhesive tape on the lower surface are performed. Therefore, the operations of inverting the packing box, cutting the lower surfaces, and folding the packing box according to the folding system of this embodiment may be performed in a series of processes.

However, this series of processes may not be essential, and the packing box 1 in a state of being processed by the folding system of this embodiment may be placed on the conveyor belt 10 included in the folding system of this embodiment.

The fixed guide panel 20 may extend from the upper stream to the down stream on one side of the conveyor belt 10 in the width direction "W."

The fixed guide panel 20 may include upper panels 21 and 22 and lower panels 23 and 24 fixed to the frame 80, vertically spaced apart from each other, and extending in parallel to each other.

Each of the upper and lower panels 21 to 24 may be divided into two portions.

The first portions 21 and 23 disposed upstream of the upper and lower panels may extend parallel to the conveyor belt 10, and the second portions 22 and 24 extending downstream from an end of the first portions may be inclined inward the width direction.

The support device 70 may be disposed at the rear of the first portions 21 and 23 of the upper and lower panels in the width direction.

The support device 70 may include a movable panel 71 advanced and retreated in the width direction, a driving module 73 having a tip to which the movable panel 71 is fixedly attached, fixed to the frame 80 and including a pneumatic cylinder and a linear guide, and four aspirator 72 positioned on a surface of the movable panel 71, facing inward the width direction.

The movable panel 71 of the support device may be driven linearly by the driving module 73 to be advanced and retreated in the width direction "W." The aspirator 72 may protrude or retreat between the upper and lower panels 21 and 22 of the fixed guide panel 20 and function to vacuum-suction and fix the side surface 8 of the packing box 1, transported by the conveyor belt 10.

The first pressing device 40 may be disposed on the second portions 22 and 24 of the fixed guide panel 20. The first pressing device 40 may include a movable panel 41 having a flat panel shape and a driving module 42 attached to the frame 80 to advance and retreat the movable panel 41.

In a plan view, the movable panel 41 and driving module 42 of the first pressing device 40 may have an angle perpendicular to the second portions 22 and 24 of the fixed guide panel 20 to be disposed inward the width direction "W." In addition, the movable panel 41 may be inclined inward the width direction "W" and upstream in the transport direction "F" to be advanced and retreated.

Accordingly, the movable panel 41 may be advanced and retreated between the second portions 22 and 24 of the fixed guide panel 20, and advanced while being inclined inward the width direction "W" and upstream in the transport direction "F" to press the side surface 8 of the side surfaces of the packing box 1, placed downstream perpendicular to the transport direction "W," in a state where the side surface 8 is inclined by the second portions 22 and 24 of the fixed guide panel 20.

Similarly to the first pressing device 40, the second pressing device 50 may include a movable panel 51 having the flat panel shape and a driving module 52 attached to the frame 80 to advance and retreat the movable panel 51.

The movable panel 51 of the second pressing device 50 may protrude inward the width direction "W" at a point beyond a downstream end point of the fixed guide panel 20 to press the side surfaces 7 and 8 of the packing box 1, and the side surfaces 7 and 8 of the packing box 1 moved downstream may be pressed by sliding on a surface of the movable panel 51.

The movable suction device 30 may be disposed to face the fixed guide panel 20 and the first and second pressing devices 40 and 50 in the width direction "W," with the conveyor belt 10 interposed therebetween.

The movable suction device 30 may function to suction and press the side surfaces 7' and 8' opposite to the side surfaces 7 and 8 of the packing box 1, which the fixed guide panel 20, the first and second pressing devices 40 and 50 and the support device 70 come into contact with or suction to press or support, and transport the side surfaces 7' and 8' in the transport direction "W."

The movable suction device 30 may include a plurality of aspirators 31 suctioning the side surfaces 7' and 8' of the packing box 1, and a movable panel 32 to which the aspirators 31 are coupled. The movable panel 32 may be disposed to face the side surfaces 7' and 8' of the packing box 1, and the aspirators 31 may be attached to the movable panel 32 to face the side surfaces 7' and 8' of the packing box 1.

The movable panel 32 may have a length to suction both the side surfaces 7' and 8' when the two side surfaces 7' and 8' of the packing box 1 are unfolded in parallel to each other, and the total of six aspirators 31 in two rows of three up and down may be disposed on the movable panel.

The movable panel 32 may perform three operations: movement in the transport direction "F," advance and retreat in the width direction "W," and rotation by 90 degrees to direct the aspirators 31 downward.

The frame 80 may include a rail 81 provided outward the width direction of the conveyor belt 10 along the transport direction "F," and a first frame 33 of the movable suction device 30 may be coupled to the rail 81 to be linearly moved along the rail 81.

The linear movement may be achieved by engaging the frame 33 with a screw device (not shown) built in the rail 81. However, a linear movement device is not limited thereto and may be implemented by the pneumatic cylinder or a timing belt.

A second frame 34 may be coupled to the first frame 33 of the movable suction device 30 to be rotated around its end portion adjacent to the conveyor belt 80 in the width direction "W." A linear driving module 35 may be fixed to an upper side of the second frame 34. The driving module 35 may be equipped with the pneumatic cylinder and a linear guide to advance and retreat the movable panel 32 in the width direction "W."

The first frame 33 may be provided with a pneumatic cylinder 36 for rotation on the outside in the width direction "W." The pneumatic cylinder 36 for rotation may be an actuator rotating the movable panel 32 downward in a vertical direction, may be attached to the first frame 33 to be rotated about an axis parallel to the transport direction "F," and may include an operating tip coupled to and rotated about the second frame 34.

According to this configuration, the pneumatic cylinder 36 for rotation may rotate the second frame 34 and the linear driving module 35 about an axis parallel to the width direction "W," and the movable panel 32 and the aspirators 31, coupled to the linear driving module 35, may be switched between an upright position, i.e., position to face the fixed guide panel 20 placed on the opposite side in the width direction "W," and the position to direct vertically downward.

Meanwhile, the conveyor belt 10 may extend to vicinity of the downstream end point of the fixed guide panel 20 in the transport direction "F." However, the rail 81 guiding the movement of the movable suction device 30 in the transport direction "F" may extend downstream beyond end points of the conveyor belt 10 and the fixed guide panel 20. Accordingly, the movable suction device 30 may be moved downstream beyond the position of the fixed guide panel 20.

At a downstream point beyond the position of the fixed guide panel 20, a facility (not shown) in which the packing boxes 1 folded and overlapped by the folding system of this embodiment fall and are stacked on each other may be placed below the movable suction device 30.

The opening device 60 may be disposed below the position where the support device 70 is disposed, in the transport direction "F."

The opening device 60 may include a bar 61 extending in a transport direction and moved up and down, a first roller 62 attached to an upper side of the bar, a second roller 63 attached to each of two ends of the bar 61, and a driving module 64 attached to the frame 80 while moving the bar 61 up and down.

The bar 61 may be disposed between the conveyor belts 10 by the driving module 64 and raised between the conveyor belts 10 to protrude or lowered, and the first and second rollers 62 and 63 attached to the bar 61 may be in contact with the lower panels 5 and 6 covering the lower surface of the packing box 1, and raised to allow the lower panels 5 and 6 of the packing box 1 to be pivoted against the side surfaces 7 and 8 of the packing box 1 to be opened.

Hereinafter, referring to FIGS. 5 to 11, the description describes an operation in which the packing box is introduced, folded, overlapped and discharged in the folding system of this embodiment.

Figure 5:
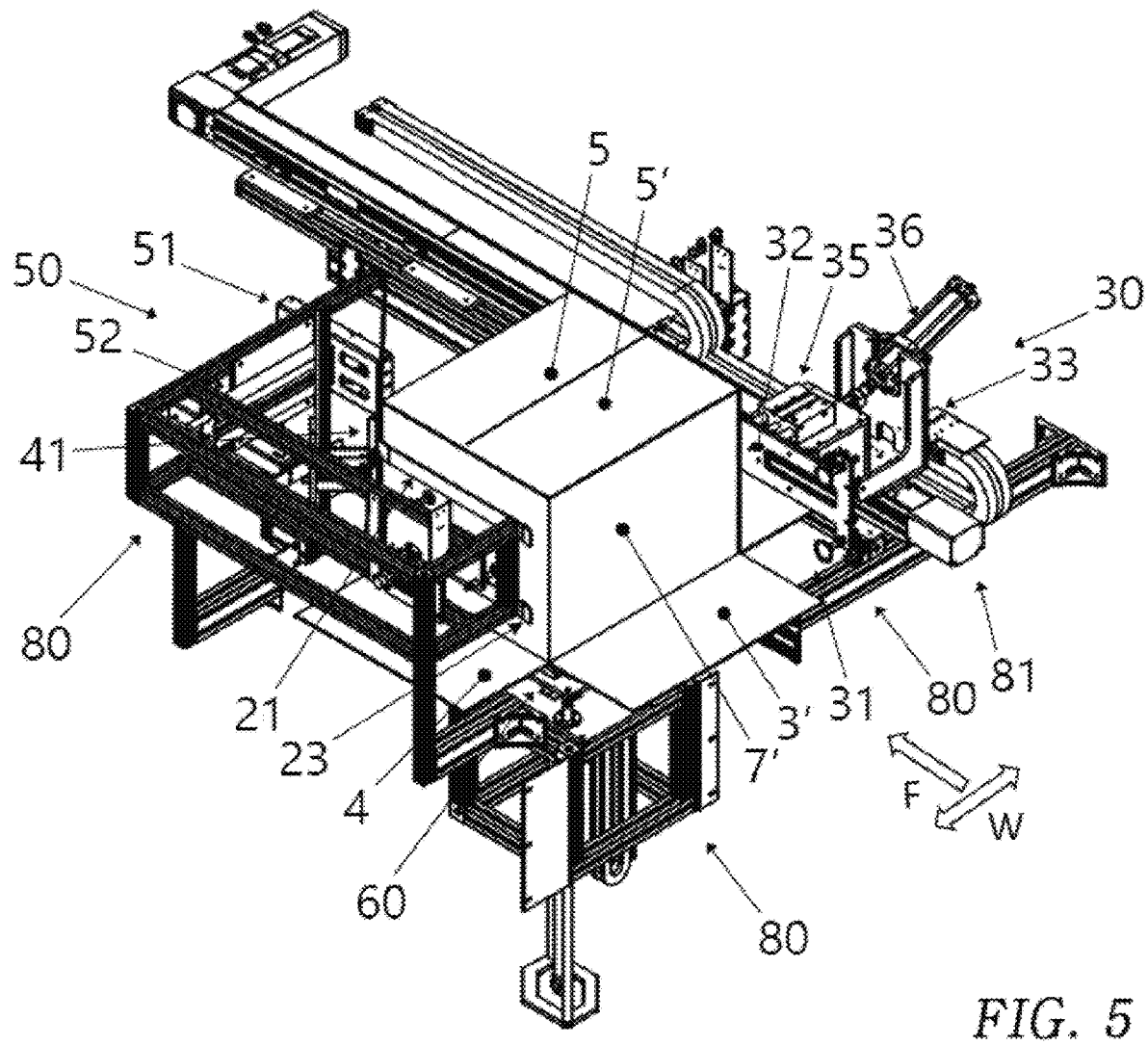
FIGS. 5 to 11 are perspective views and plan views sequentially showing operations of the folding system according to an embodiment of the present invention.
Figure 6:
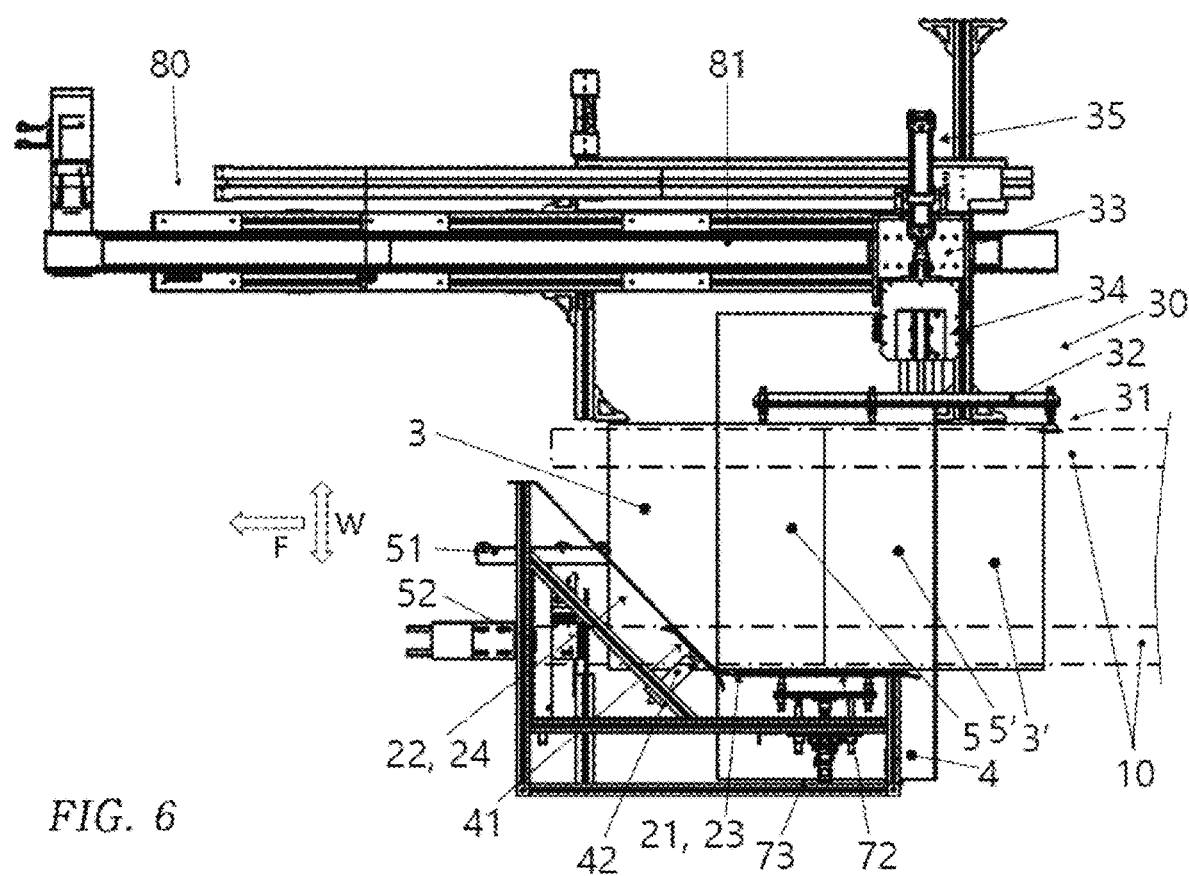

First, FIGS. 5 and 6 show a state where the packing box 1 is introduced by the conveyor belt 10.

The packing box 1 may be introduced in a state where the upper panels 3 and 4 are supported and unfolded by the conveyor belt 10, and the lower panels 5 and 6 turned upward may be introduced while covering the lower surface.

The side surfaces 8 and 8' of the packing box 1, opposite to each other, may be stopped at a position where the side surfaces 8 and 8' face the first portions 21 and 23 of the fixed guide panel 20. After the stop, the aspirator 72 may suction and press one side surface 8 of the packing box 1 inward the width direction "W" while the movable panel 71 of the support device 70 protrudes.

Here, the movable suction device 30 may be placed on a position where the movable panel 32 faces the opposite surface 8' of the packing box 1, and the driving module 35 and the aspirator 31 may be operated to advance the movable panel 32 in the width direction "W" to suction and press the opposite side surface 8' of the packing box 1 inward the width direction. The downstream movable panel 32 of the movable suction device may face the opposite side surface 8' in the transport direction "F," and the downstream four aspirators 31 may suction the opposite side surface 8'.

Accordingly, the packing box 1 may be fixed and supported at its position because the two side surfaces 8 and 8' opposite to each other are suctioned and pressed.

In this state, the bar 61 of the opening device 60 disposed below the conveyor belt 10 may not interfere with the movement of the packing box 1.

Figure 7:
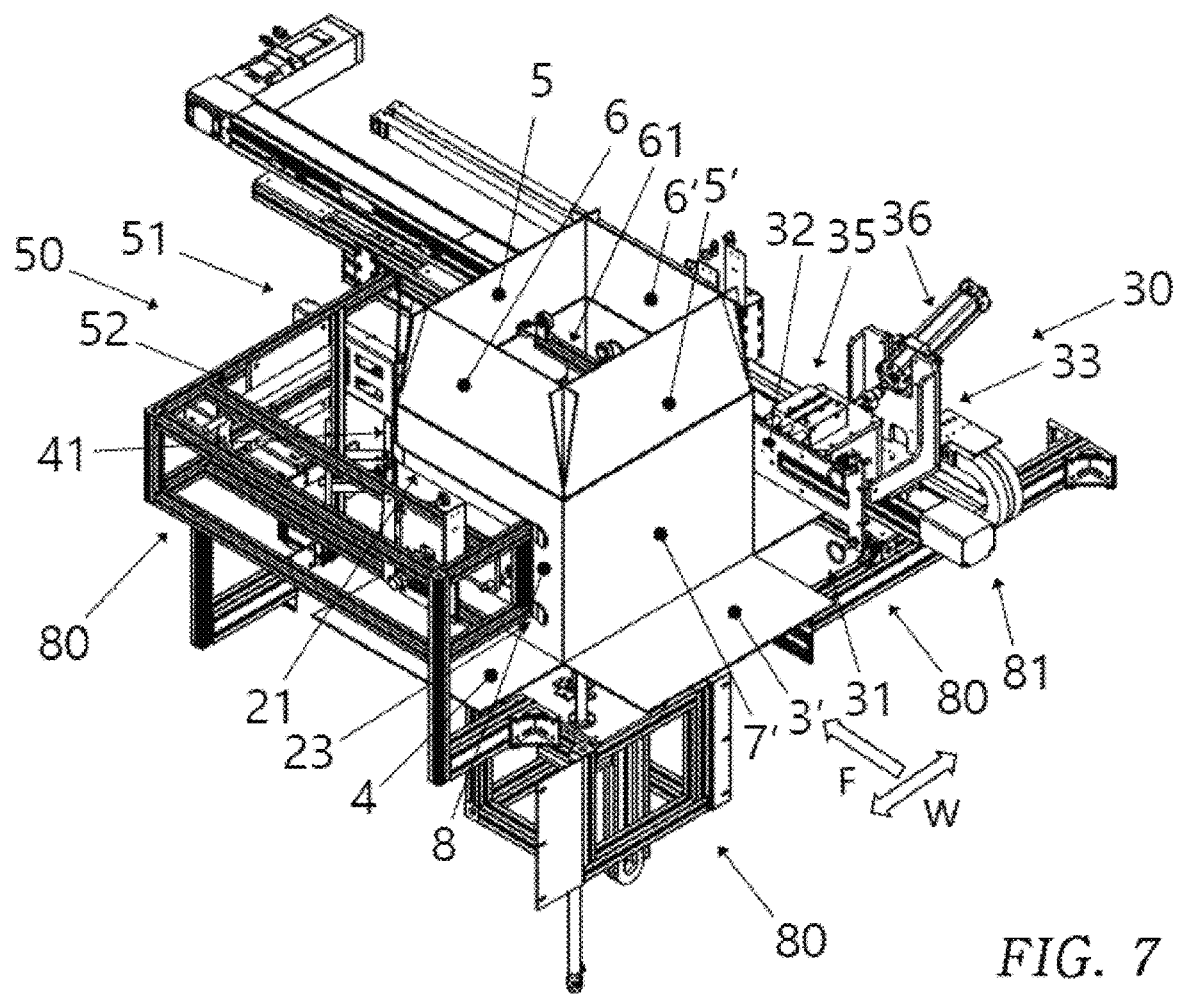
Figure 8:
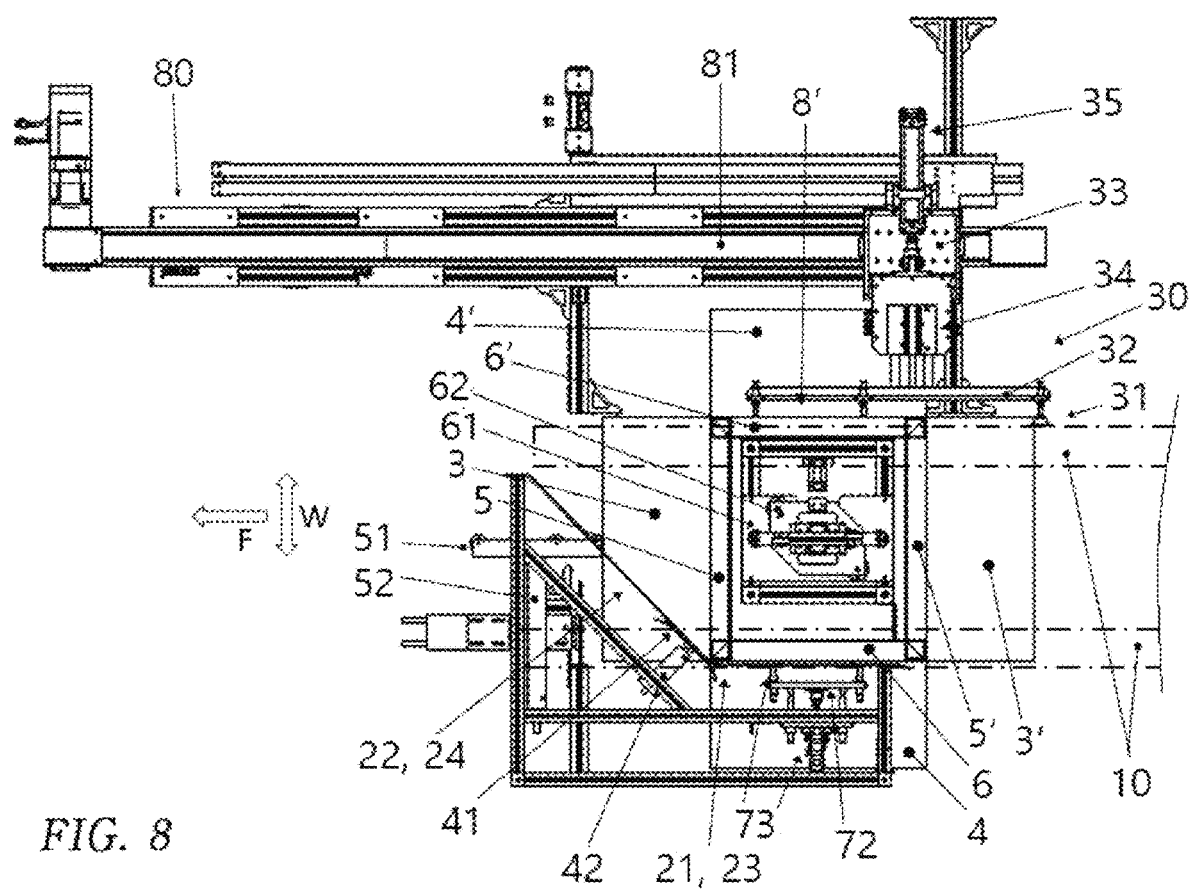

Referring to FIGS. 7 and 8, the bar 61 of the opening device 60 may be raised in the state where the packing box 1 is fixed by the movable suction device 30 and the support device 70.

The upper panels 3 and 4 may be unfolded without covering the upper surface, and the upper surface of the packing box 1 may be opened, and the bar 61 may be raised upward through the inside of the packing box 1 to come into contact with and press the lower panels 5 and 6 covering the lower surface.

Accordingly, the four lower panels 5 and 6 may be opened by being pivoted with respect to the side surfaces 7 and 8 of the packing box 1.

The operation of folding the packing box 1 may start when the lower panels 5 and 6 are opened in this way.

The folding operation may be an operation in which the two side surfaces 7 and 8, adjacent and perpendicular to each other, are unfolded to be parallel to each other, the other two side surfaces 7' and 8', adjacent and perpendicular to each other, and opposite to these side surfaces, are also unfolded to be parallel to each other, and the two side surfaces 7 and 8 and the two side surfaces 7' and 8' in opposite relationships eventually overlap each other.

When the lower panels 5 and 6 are opened, the bar 61 of the opening device may be lowered, and the movable panel 71 and aspirator 72 of the support device 70 may also be retreated. In this state, the movable panel 32 of the movable suction device 30 may be moved downstream in the transport direction "F" while pressing the packing box 1 inward the width direction "W."

Accordingly, the side surface 8 of the packing box 1, facing the first portions 21 and 23 of the fixed guide panel 20, may come into contact with the first portions 21 and 23 to slide in the transport direction "F."

However, the second portions 22 and 24 of the fixed guide panel 20 may be positioned downstream in the transport direction "F" while being inclined in the width direction "W." The side surface 8 facing the first portions 21 and 23 may thus come into contact with the second portions 22 and 24 to be pressed inward the width direction, and the side surface 8 of the packing box 1, placed downstream, may be rotated to come into contact with the second portions 22 and 24.

As a result, these two side surfaces 7 and 8, adjacent and perpendicular to each other, may be pressed to be unfolded to be parallel to each other, and the side surfaces 7' and 8' opposite to these side surfaces may also receive an unfolding force by this pressure.

In this state, the first pressing device 40 may be operated, such that the movable panel 41 may protrude between the second portions 22 and 23 of the fixed guide panel 20 to press the side surface 8 of the packing box 1, placed downstream, inward the width direction "W" and upstream in the transport direction "F."

Figure 9:
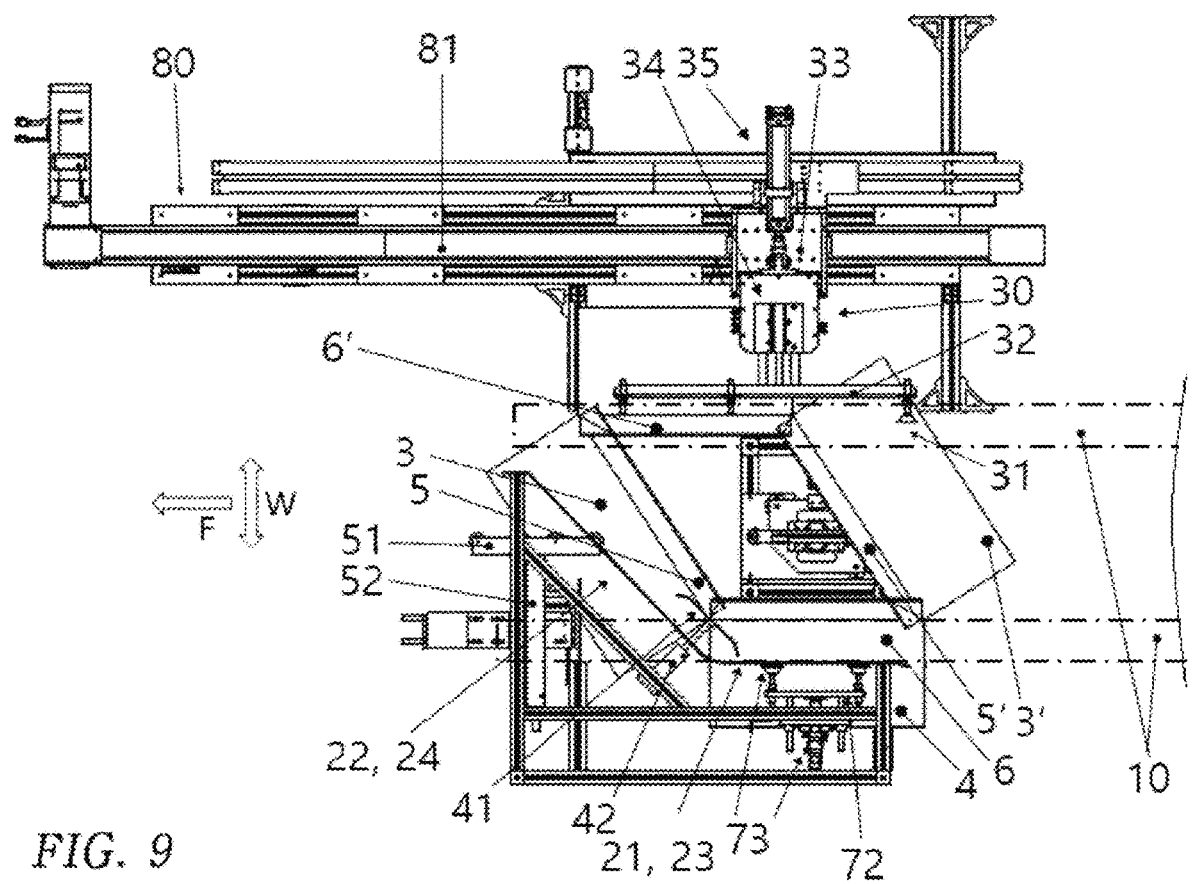

As shown in FIG. 9, the packing box 1 may be deformed in a direction in which the packing box is folded by the operations of the movable suction device 30 and the first pressing device 40. As the movable suction device 30 continues to be moved downstream, the packing box 1 may have more unfolded side surfaces and the opposite side surfaces closer to each other.

When a boundary of the adjacent side surfaces 7 and 8 of the packing box 1 is placed at a position of the movable panel 51 of the second pressing device 50, the movable panel 51 of the second pressing device 50 may be advanced inward the width direction "W" to press the side surfaces 7 and 8 of the packing box 1 in the width direction "W."

Figure 10:
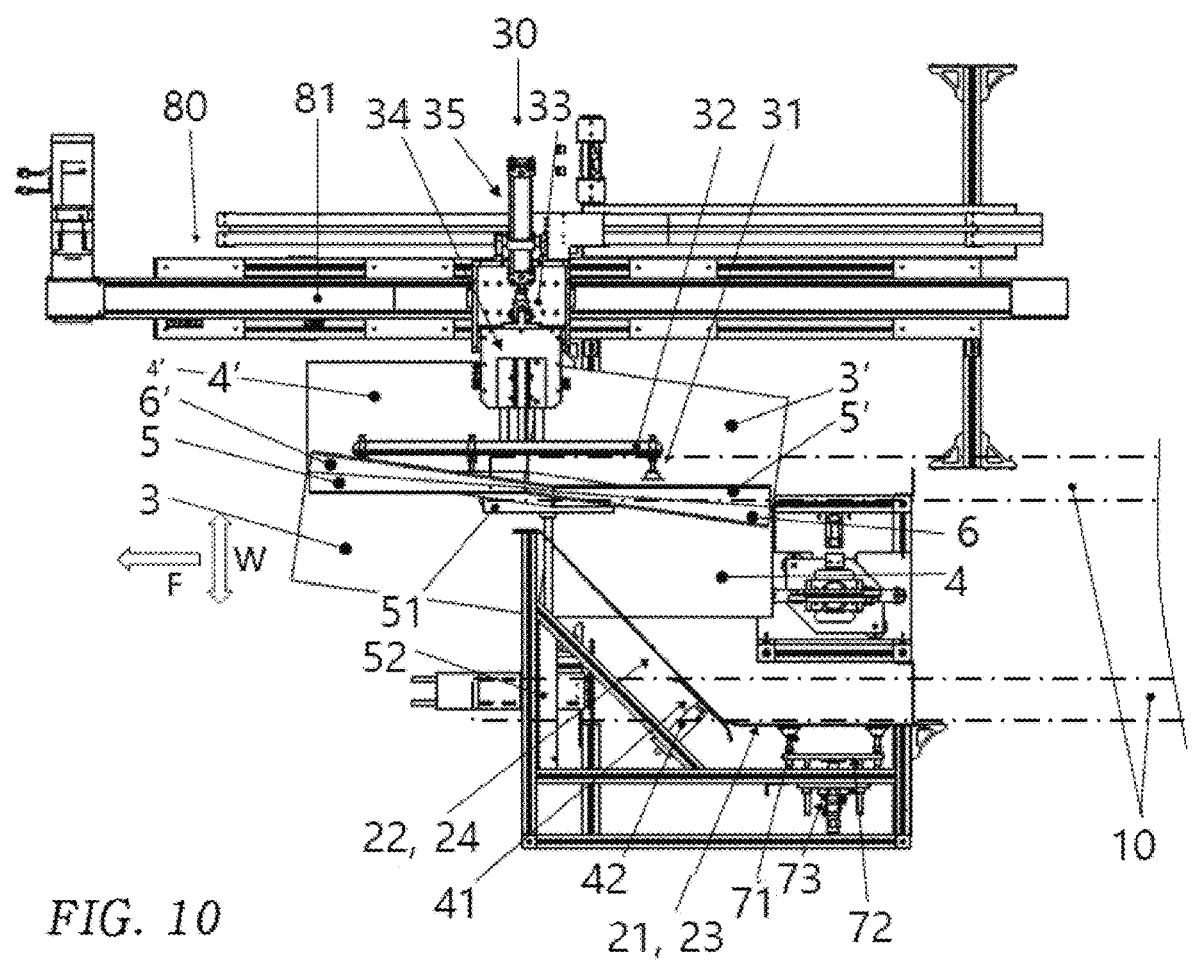

As shown in FIG. 10, in the above process, the side surfaces 7 and 8 of the packing box 1 may come into contact with the opposite side surfaces 7' and 8' suctioned by the movable suction device 30, and the adjacent side surfaces 7 and 8, and 7' and 8' may thus be fully unfolded. The lower panels 5 and 6 may also be unfolded in the same way as the side surfaces. The lower panels adjacent to each other may be unfolded and the lower panels opposite to each other may thus come into contact with each other.

At the beginning of the folding process, only the side surface 7' placed on the movable suction device 30 inward the width direction "W" may be suctioned by the aspirator 31. However, as the folding process progresses, the side surface 8' adjacent to the side surface 7' and placed upstream in the transport direction "F" may be unfolded against the adjacent side surface 7', and may simultaneously come close to the movable panel 32 of the movable suction device to be brought into contact with and suctioned by the aspirator 31 placed upstream of the movable panel 32.

As the movable suction device 30 is moved further downstream in the transport direction "W," the side surfaces 7 and 8 of the packing box 1 may slide along the movable panel 51 of the second pressing device 50, and be separated from the conveyor belt 10.

Accordingly, the upper panels 3 and 4 unfolded by the conveyor belt 10 may be moved to be closed by an elastic restoring force to overlap each other. As a result, when separated from the conveyor belt 10, among the side surfaces 7 and 8, the upper panels 3 and 4 and the lower panels 5 and 6, all the adjacent portions may be unfolded and all the opposite portions may be in contact with each other, and the packing box 1 may thus have the two panels entirely overlapping each other.

Even though separated from the conveyor belt 10 and the second pressing device 50, the packing box 1 may be maintained to be suctioned by the movable suction device 30. In this state, the pneumatic cylinder 36 for rotation of the movable suction device 30 may be operated to rotate the movable panel 32.

Figure 11:
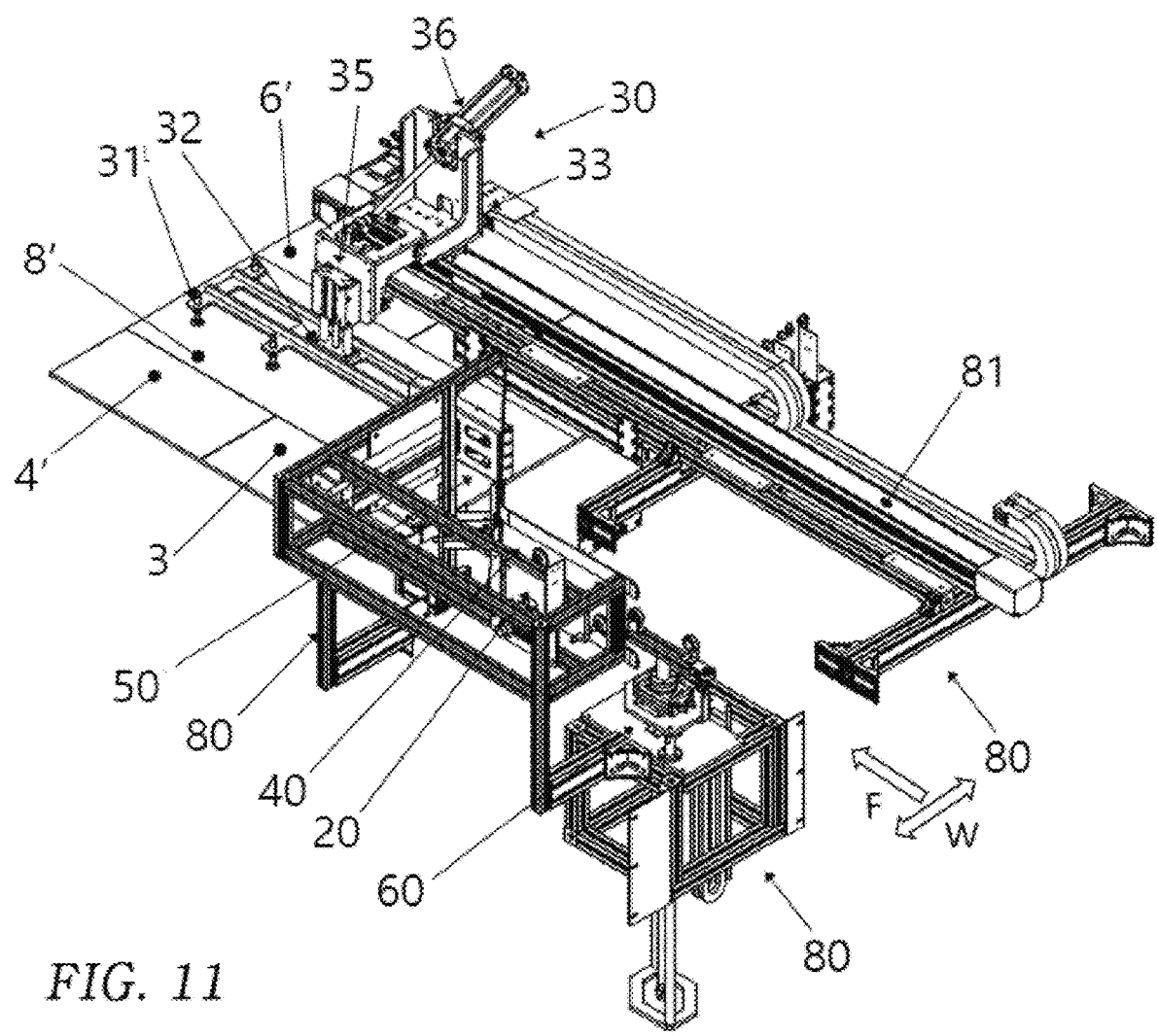

FIG. 11 shows this rotation state.

In this state, the packing box 1 may have all the surfaces horizontal to the ground, and the aspirator 31 of the movable suction device 30 may stop the suction. Accordingly, the packing box 1 may fall by gravity from the folding system of this embodiment.

A flat surface (not shown) on which the falling packing box 1 is to be placed may be provided downstream of the end point of the conveyor belt 10, and the packing boxes folded and falling may be stacked up and down sequentially on the flat surface by the folding system of this embodiment.

The stacked packing boxes may be bundled together and transported for recycling.

As described above, the packing box folding system according to an embodiment of the present invention may introduce the empty packing box thereinto and perform the folding operation without human intervention.

Although the configuration and operation of the packing box folding system according to the embodiment of the present invention have been described above, the present invention is not limited to the disclosed embodiment and various modifications and additions of elements are possible within the scope of the present invention as disclosed in the claims.

The invention claimed is:

1. A packing box folding system, in which a packing box is folded as surfaces of the packing box are overlapped by in contact with each other, the packing box having a rectangular parallelepiped shape and including upper and lower surfaces opposite to each other and respectively opened by unfolding upper panels and lower panels, the system comprising:
   a transport conveyor on which the packing box is loaded and which transports the packing box from a position where the packing box is introduced to a position where the folded packing box is discharged;
   a fixed guide panel which extends between the position where the packing box is introduced to the position where the folded packing box is discharged, is disposed on one side of the transport conveyor in a width direction, and is able to come into contact with two side surfaces of the packing box, which are adjacent to each other;
   a movable suction device which is disposed opposite to the fixed guide panel in the width direction of the transport conveyor, is movable between the position where the packing box is introduced and the position where the packing box is discharged, suctions side surfaces which are opposite to the side surfaces of the packing box, in contact with the fixed guide panel, and presses the suctioned side surfaces inward the width direction;
   a first pressing device which is disposed between both end portions of the fixed guide panel in a transport direction of the transport conveyor, and obliquely presses the side surface placed downstream among the side surfaces of the packing box, in contact with the fixed guide panel, inward the width direction and upstream in the transport direction; and
   a second pressing device which is disposed downstream of the first pressing device in the transport direction of the transport conveyor, and presses the surface of the packing box, in contact with the fixed guide panel, inward the width direction,
   wherein the fixed guide panel includes a first surface extending parallel to a side surface parallel to the transport direction of the transport conveyor, among the two side surfaces of the packing box, adjacent to each other, and a second surface placed downstream of the first surface and extending obliquely inward the width direction with respect to the transport direction,
   the packing box is introduced into the transport conveyor and one side surface of the packing box, placed parallel to the transport direction, comes into contact with the first surface of the fixed guide panel, and
   as the movable suction device suctions the side surfaces of the packing box and presses the suctioned side surfaces of the packing box inward the width direction, while being moved downstream, among the side surfaces of the packing box, placed downstream perpendicular to the transport direction, the side surfaces of the packing box, adjacent and perpendicular to each other, are unfolded, and the side surfaces of the packing box, opposite to each other, come into contact with and overlap each other, by being pressed by the first pressing device, the second pressing device and the movable suction device.

2. The system of claim 1, wherein the movable suction device is capable of being rotated for the side surfaces of the packing box to be placed horizontally in a state of suctioning the packing box, whose side surfaces are overlapped by in contact with each other.

3. The system of claim 1, wherein the movable suction device includes a frame which is movable in the transport direction, a movable panel which extends in the transport direction, a plurality of aspirators which are arranged on a surface of the movable panel, facing inward the width direction, a driving module which presses the movable panel inward the width direction, and an actuator which rotates the movable panel vertically downward.

4. The system of claim 1, in which the packing box is introduced into the transport conveyor in a state where the upper panels are unfolded, the upper surface is placed on the transport conveyor and the lower panels covering the lower surface are turned upward, the system further comprising an opening device which opens the lower panels of the packing box from the lower surface of the packing box, wherein the opening device includes a means which is placed below the transport conveyor, enters the packing box through the opened upper surface of the packing box, and presses the lower panels upward to be opened.

5. The system of claim 4, further comprising a support device which is placed at a rear of the fixed guide panel in the width direction of the transport conveyor, and protrudes in the width direction to come into contact with and support the side surfaces of the packing box when the lower surface of the packing box is opened by the opening device, wherein the support device and the movable suction device press and fix the side surfaces of the packing box, opposite to each other, when the lower surface of the packing box is opened.

* * * * *